(12) United States Patent
Yoshida et al.

(10) Patent No.: US 6,465,919 B1
(45) Date of Patent: Oct. 15, 2002

(54) MOTOR HAVING RESIN-MADE MOTOR BASE FROM WHICH BOTTOM FACE A METAL TERMINAL EXPOSES ITS LOWER FACE, AND DEVICE USING THE SAME MOTOR

(75) Inventors: Shigeru Yoshida, Tottori (JP); Kodo Fukuoka, Tottori (JP); Koji Kuyama, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 09/675,062

(22) Filed: Sep. 28, 2000

(30) Foreign Application Priority Data

Dec. 28, 1999 (JP) ............................................ 11-373874

(51) Int. Cl.⁷ .......................... H02K 29/00; H02K 3/50; H02K 5/22
(52) U.S. Cl. ........................................ 310/71; 310/67 R
(58) Field of Search ............................... 310/71, 43, 89, 310/91, 68 R, 40 MM; 439/81–83, 876–887, 889–890; 29/748; 360/99.08, 99.04, 98.07

(56) References Cited

U.S. PATENT DOCUMENTS

| | | | |
|---|---|---|---|
| 4,836,792 A | 6/1989 | Glover | 439/81 |
| 4,969,829 A | * 11/1990 | Sato | 439/83 |
| 5,668,423 A | * 9/1997 | You et al. | 310/40 MM |
| 6,097,121 A | * 8/2000 | Oku | 310/71 |
| 6,305,976 B1 | * 10/2001 | Tsuji et al. | 439/570 |

FOREIGN PATENT DOCUMENTS

| | | | |
|---|---|---|---|
| EP | 0 511 876 A1 | 4/1992 | |
| EP | 0 539 094 A2 | * 10/1992 | 310/71 |
| JP | 5-103451 | 4/1993 | |
| JP | 10127031 | 5/1998 | |
| JP | WO99/41020 | 8/1999 | |

* cited by examiner

Primary Examiner—Tran Nguyen
(74) Attorney, Agent, or Firm—RatnerPrestia

(57) ABSTRACT

A motor includes a rotor, a stator facing to the rotor, a motor-base-assembly for journaling the rotor and holding the stator. The motor-base-assembly is made of resin and includes a motor-base having openings and terminals made of metal. These terminals are inserted into the openings to be mated with the motor-base, and lower faces of the terminals are exposed from the bottom of the motor-base. This structure allows the terminals to be mated with the motor-base without using an insert-molding method, and permits high productivity of the motor. This advantage appears conspicuously in such a small motor, among others, as can be directly re-flow soldered to a board of a device. The device employing this motor enjoys high productivity and reliability because the motor can be directly re-flow soldered to the board of device.

13 Claims, 5 Drawing Sheets

MOTOR HAVING RESIN-MADE MOTOR BASE FROM WHICH BOTTOM FACE A METAL TERMINAL EXPOSES ITS LOWER FACE, AND DEVICE USING THE SAME MOTOR

TECHNICAL FIELD

The present invention relates to a micro-motor and a device to which the motor is mounted. More particularly, the present invention relates to a motor having a resin-made motor base from which bottom face a metal terminal exposes its lower face, so that the motor can be soldered directly to a device board by re-flow soldering.

BACKGROUND ART

The Japanese Patent Application Non-Examined Publication No. H-10-127031 discloses a technique of improving the productivity of motor. This prior art addresses a brushless motor of an outer-rotor type motor. A metal wiring terminal plate is insert-molded in the motor-base so that the plate is buried in the motor-base. This insert-molding makes the following coupling job with ease, i.e. a first end of terminal plate protrudes as a riser over a stator winding from an upper end of the motor-base, and a winding's terminal is coupled to the riser.

When the motor-base is manufactured by insert-molding the metal wiring terminal plate, the assembling of the motor becomes easier; however, it takes time to supply the plate into a mold, and the time for resin molding increases in general. Further, one mold cannot accommodate numbers of cavities. This method thus yields less numbers of moldings per unit time than a simple resin molding method. As a result, this method incurs an increase of molding cost.

Recently, a motor has been mounted to a device board by re-flow soldering in order to improve the productivity of the device. Because such a motor measures so small that it is effective from the view of assembling efficiency to bury motor-terminals in the motor-base by insert-molding. However, since the problems discussed above are not favorable to the insert-molding, a structure of motor with good workability as well as productivity, and yet, without using the insert-molding has been demanded.

SUMMARY OF THE INVENTION

The present invention addresses the problems discussed above and aims to provide a motor of which motor base can be mounted with motor-terminals without using an insert-molding, and the motor allowing high productivity. More particularly, the present invention aims to provide a structure of the motor measuring so small to be soldered directly to a device board by re-flow soldering.

The motor of the present invention comprises the following elements:

(a) a rotor;
(b) a stator facing to the rotor; and
(c) a motor-base-assembly for journaling the rotor as well as holding the stator; this assembly including:
(c-1) a motor-base made of resin and having openings;
(c-2) terminals made of metal and mated with the motor-base by being inserted from the openings, and exposing a lower face thereof from a bottom face of the motor-base.

This structure allows the motor-terminals to be mounted to the motorbase without using the insert-molding, and also allows high productivity. The motor of this structure can be soldered directly to the device board by re-flow soldering, thereby improving productivity as well as reliability of the device.

The device according to the present invention comprises the following elements:

(a) a motor;
(b) a board on which the motor is mounted; and
(c) a driver for driving the motor, where the motor includes the following elements:

(a-1) a rotor;
(a-2) a stator facing to the rotor; and
(a-3) a motor-base-assembly for journaling the rotor as well as holding the stator; this assembly including:

(a-3-1) a motor-base made of resin and having openings;
(a-3-2) terminals made of metal and mated with the motor-base by being inserted from the opening, and exposing a lower face thereof from a bottom face of the motor-base.

This structure allows the device of the present invention to be soldered with the motor terminals to its board directly by re-flow soldering. As a result, the device of high productivity as well as high reliability is obtainable.

DETAILED DESCRIPTIONS OF PREFERRED EMBODIMENTS

Exemplary embodiments of the present invention are demonstrated with reference to the accompanying drawings.

EXEMPLARY EMBODIMENT 1

Figure 1:
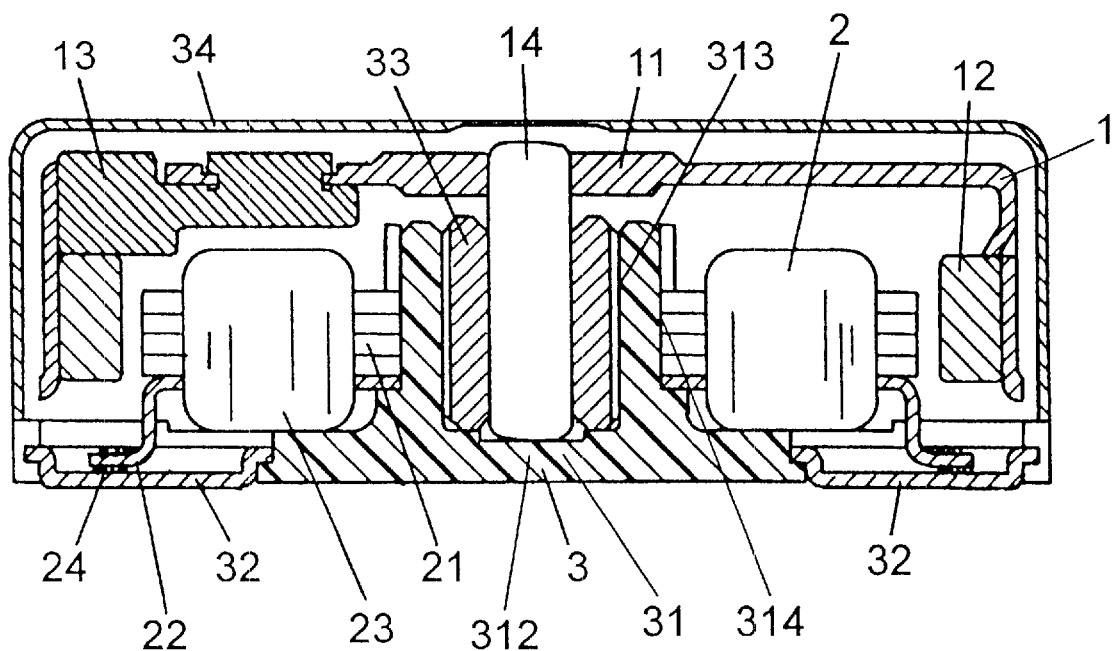
FIG. 1 is a cross section illustrating a structure of a motor in accordance with a first exemplary embodiment of the present invention.

FIG. 1 is a cross section illustrating a structure of a motor in accordance with the first exemplary embodiment of the present invention.

The motor shown in FIG. 1 is mounted to e.g. a cellular phone as a vibrator, and notifies a user of a call by vibration. The motor has an eccentric weight in its rotor for generating vibration.

In FIG. 1, the motor comprises rotor 1, stator 2 and motor-base-assembly 3. Rotor 1 includes rotor frame 11 and ring-shaped magnet 12 mounted to the inner wall of rotor frame 11. Eccentric weight 13 is mounted to a part of rotor frame 11. Rotor 1 revolves on shaft 14 mounted at the center.

Stator 2 includes stator core 21 and windings 23 coiled on core 21. Motor-base-assembly 3 includes motor-base 31 made of resin and terminals 32 made of metal.

Further, on motor-base 31, a cylindrical protrusion is vertically formed at approx. center of base 312. The inner wall of the protrusion functions as bearing supporter 313, and the outer wall thereof functions as stator supporter 314. Metal 33, i.e. the bearing, is mounted to bearing supporter 313, and shaft 14 of rotor 1 is inserted into metal 33, i.e. metal 33 journals shaft 14. Stator 2 is mounted to stator supporter 314. Stator 2 includes wire-terminating-member 22 for terminating windings 23, and windings' terminals 24 are coupled to an upper face of terminals 32. Cover 34 is coupled to motor-base-assembly 3 so that it covers rotor 1.

An appearance of the motor shown in FIG. 1 in accordance with this first embodiment is described hereinafter.

Figure 2A:
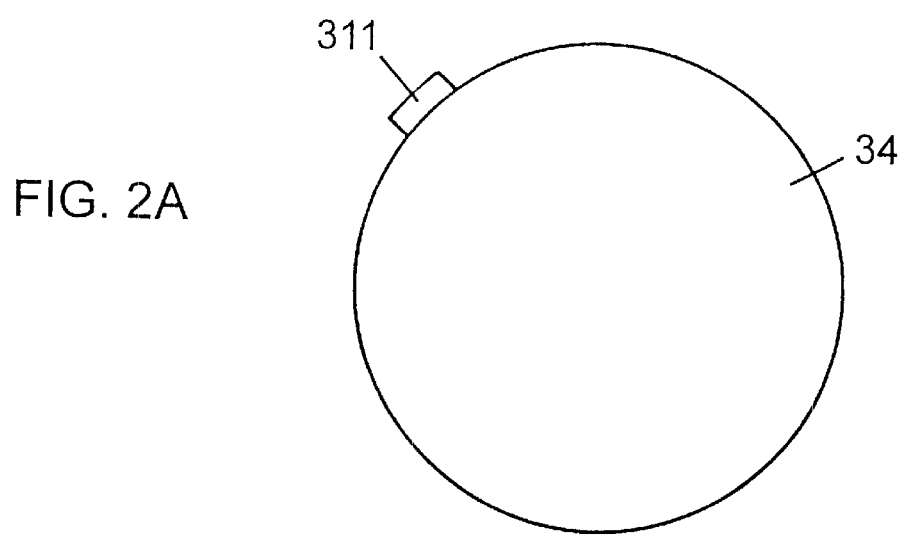
FIG. 2A shows an appearance of the motor shown in FIG. 1.
Figure 2B:
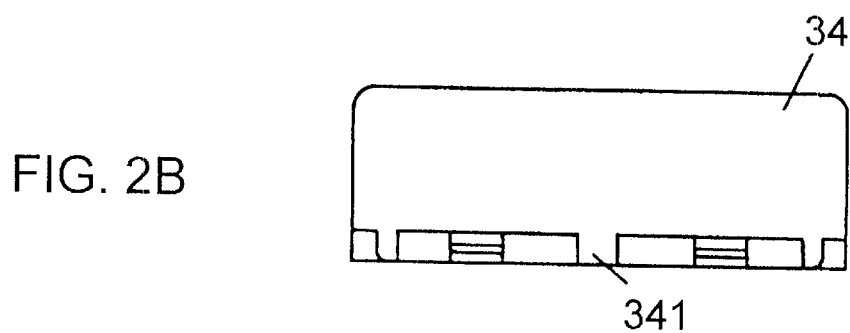
FIG. 2B is a side view of the motor shown in FIG. 1.

FIG. 2A shows an appearance of the motor shown in FIG. 1. FIG. 2B is a side view, and FIG. 2C is a bottom view of the motor shown in FIG. 1.

As shown in FIG. 2A, the motor viewed from top is covered by cover 34, and part of motor-base 311 is protruded for positioning the motor when it is mounted to a device. As shown in FIG. 2B, six protrusions 341 extend to the motor-base. These protrusions 341 are bent along the side to bottom of motor-base 31, so that cover 34 is fixed to base 31.

Figure 2C:
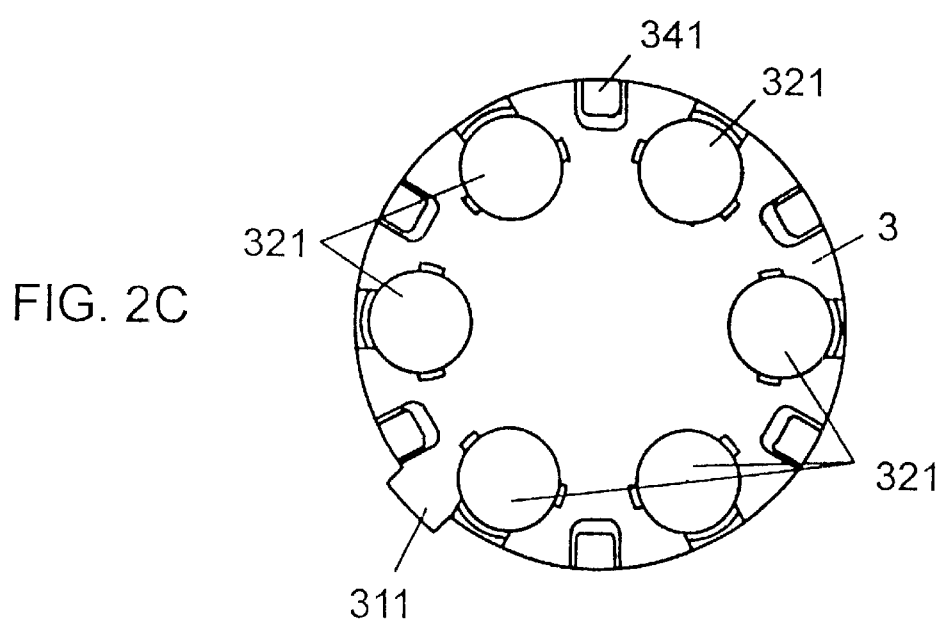
FIG. 2C is a bottom view of the motor shown in FIG. 1.

As shown in FIG. 2C, lower faces 321 of six terminals are exposed from bottom base of the motor, so that the motor can be soldered to a board of a device such as a cellular phone by re-flow soldering. The motor is powered from the board of the device via terminals 32 to windings 23, thereby spinning rotor 1. This spin causes vibration by eccentric weight 13 and vibrates the device. The user senses the vibration and notices a call.

Next, a structure of the motor-base-assembly is detailed hereinafter.

Figure 3A:
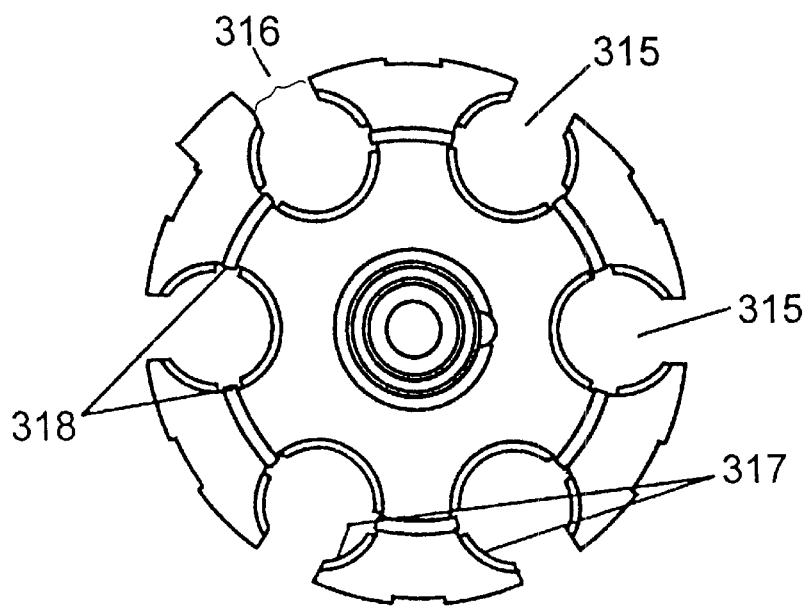
FIG. 3A is a plan view illustrating a shape of a motor-base of the motor shown in FIG. 1.
Figure 3B:
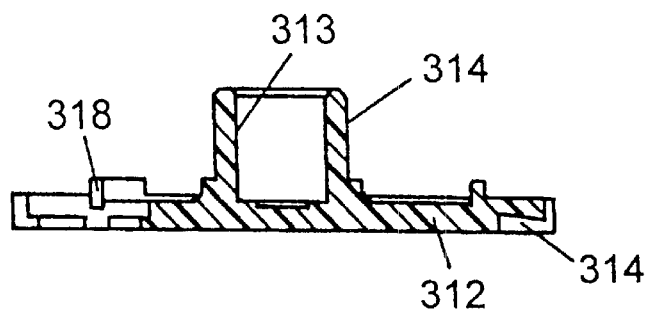
FIG. 3B is a lateral cross section of the motor-base.
Figure 3C:
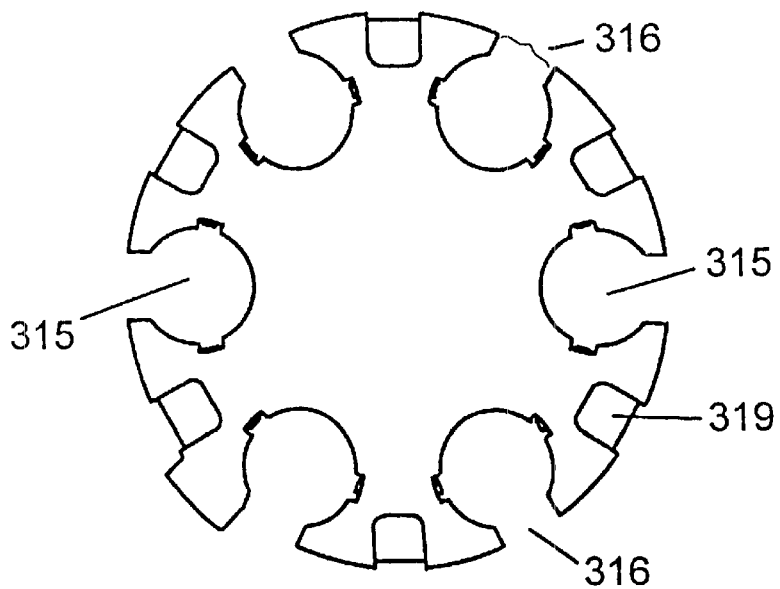
FIG. 3C is a bottom view of the motor-base.

FIG. 3A is a plan view illustrating a shape of a motor-base of the motor shown in FIG. 1. FIG. 3B is a lateral cross section and FIG. 3C is a bottom view of the motor-base.

Motor-base-assembly comprises motor-base 31 made of resin, and terminals 32 made of metal.

As shown in FIG. 3B, motor-base 31 is a resin molded, and includes approx. flat base 312 and a cylindrical protrusion vertically formed at approx. center of the base. The protrusion comprises bearing supporter 313 and stator supporter 314 concentric with bearing supporter 313.

As shown in FIG. 3A, on base 312, six circular openings 315 are formed around the protrusion, i.e. bearing supporter 313 and stator supporter 314. Part of each opening 315 is cut off. On motor-base 31, a step is formed to surround the opening for mating with terminal 32. This step section is referred to as terminal engaging section 317 to be engaged with terminal 32. Two coming-off preventing members 318 slightly overhanging the step are provided close to terminal engaging section 317, these two coming-off preventing members are provided to every opening for preventing terminals 32 from moving. Six recesses 319 are formed on the rim of base 312 in order to fix the cover, Terminals 32 are inserted into motor-base 31 to form the motor-base-assembly. Now, the motor-base-assembly is detailed.

Figure 4A:
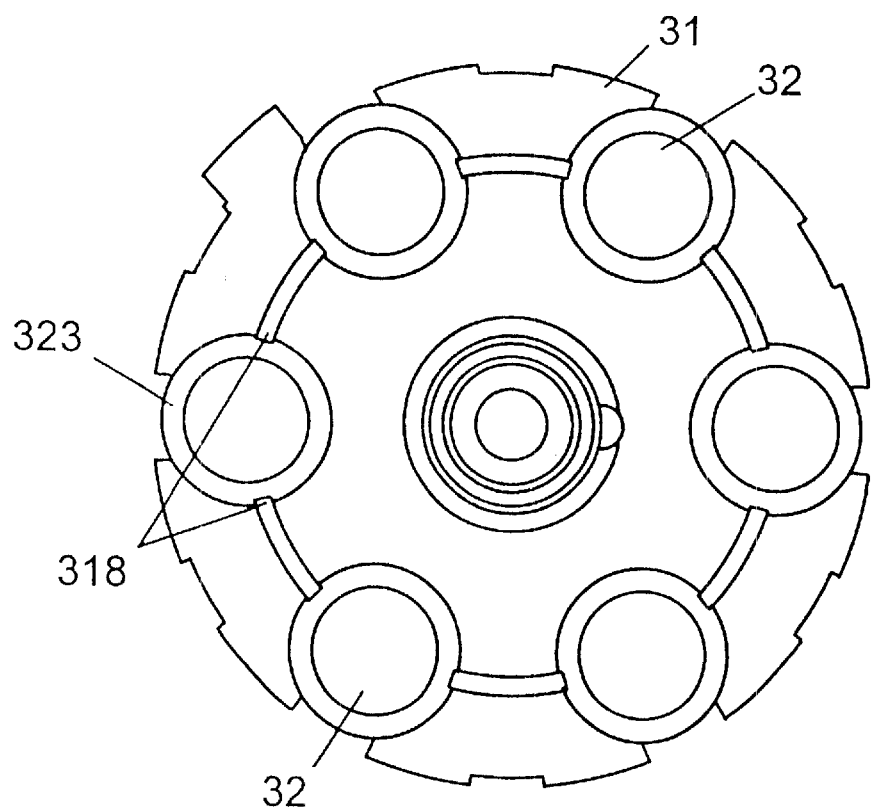
FIG. 4A is a top view of a motor-base-assembly where motor-terminals are inserted into the motor-base.
Figure 4B:
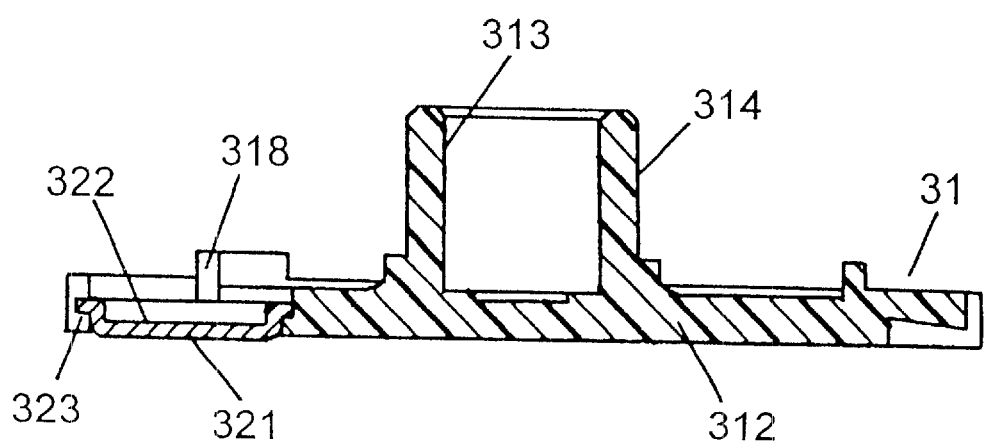
FIG. 4B is a side view of what is shown in FIG. 4A.

FIG. 4A is a top view of the motor-base-assembly where terminals are inserted into the motor-base shown in FIG. 3. FIG. 4B is a side view of what is shown in FIG. 4A.

In FIG. 4A, circular-plate-shaped terminals 32 are mated to respective six openings formed on motor-base 31. The lower face of terminal 32 functions as mounting section 321 for re-flow soldering to the board of the device to which the motor is mounted. An upper face of terminal 32 works as coupling section 322 with winding terminal 24 of stator winding 23. Base engaging section 323 engages terminals 23 with motor-base 31 by fitting itself to the rim of terminal 32. Terminals 32 have been manufactured for tightly fitting to each opening 315. On top of that, coming-off preventing member 318 slightly overhangs terminal 32 so that terminal 32 is prevented from coming off when upward load is applied to its lower face.

As such, in the motor of the present invention, terminal 32 is mated to opening 315 from the top so that lower face 321 of terminal 32 is exposed from the bottom, whereby the motor can be mounted to the board of device with reflow soldering. Motor-base 31 made of resin and terminal 32 made of metal have been independently manufactured, and terminal 32 is mated to motor-base 31 from the top, thereby forming motor-base-assembly 3. This process needs less time and less cost than the conventional process, i.e. the terminal has been insert-molded in the motor-base. As a result, the productivity of motor can be improved, and less metal is required than insert-molding, so that material such as gold plated has little chance to be wasted.

As shown in FIG. 4B, bearing supporter 313 and stator supporter 314 are unitarily molded in resin with base 312. Since the major elements of motor are unitarily molded as discussed above, components can be held or assembled to those elements at a high speed, thus high productivity is obtainable. Further, since terminal 32 is made of metal, it is easy to quickly form a shape having a large area for re-flow soldering. Coming-off preventing member 318 is disposed close to terminal-engaging-section 317 for preventing terminal 32 from moving upward. In addition to the tight mating, this arrangement secures terminal 32 from coming-off from the opening. Motor-base-assembly 3 of the present invention thus assures as much reliability as the structure by insert-molding.

Cut-off sections 316 are provided on rim of motor-base 31 so that proximity to lower face 321 of terminal 32 can be observed through this cut-off section from a side of the motor-base. This structure allows an operator to watch the re-flow soldering, so that the motor is coupled to the board with high reliability.

The motor of the present invention has plate-shaped terminals 32 with a step, i.e. step-like rim is formed on the outer wall surrounding mounting section 321 so that-base-engaging-section 323 can be formed. As a result, while a large area for mounting is maintained, the terminal can be tightly held by motor-base 31 with the rim. Since the large area for mounting is kept, terminal 32 can be strongly coupled to the device board.

When winding terminal 24 is coupled to the upper face of terminal 32, solder, silver, gold and other supplemental coupling members are not scattered around. Therefore, this structure contribute to improvement of the motor quality. The motor-base-assembly is of relatively low profile considering its large area for coupling, the assembly is thus preferable for constructing small and thin size motor.

Since terminal 32 is plate-shaped and circular, there are no directional restrictions when the assembly is assembled. The motor-base-assembly can be thus assembled at a high speed, and is best-suited for improving the productivity of micro-motors.

EXEMPLARY EMBODIMENT 2

Figure 5:
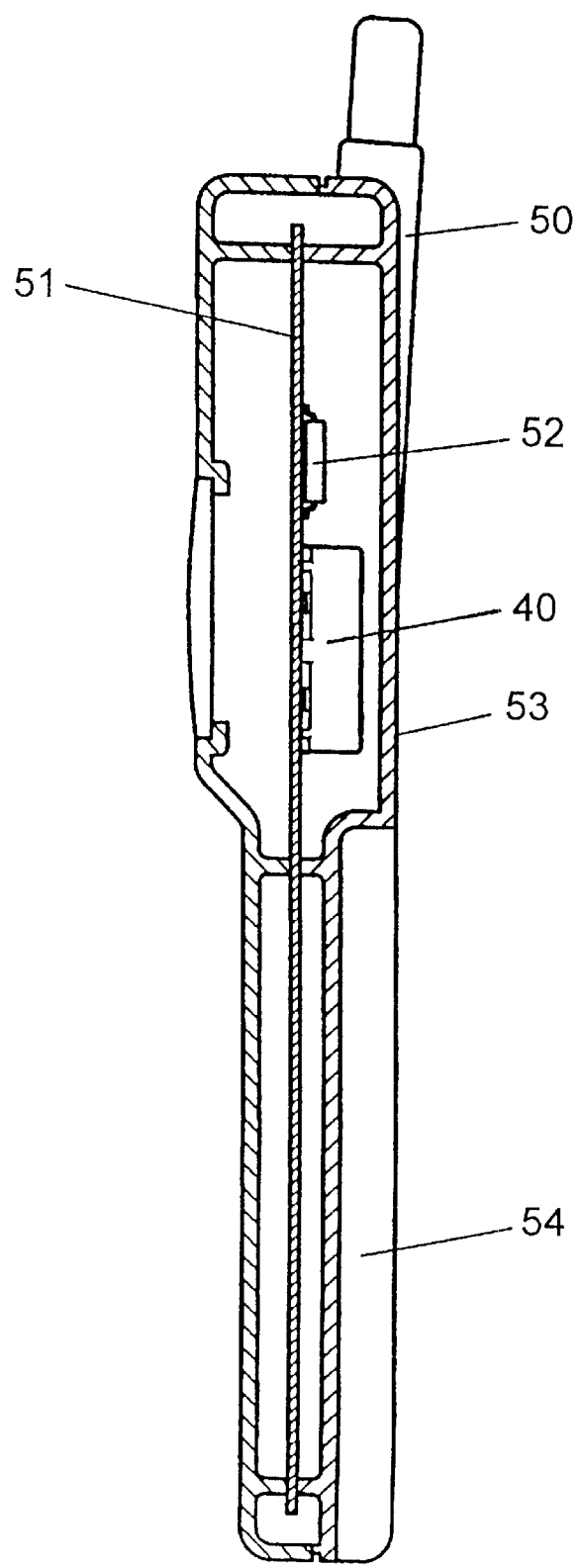
FIG. 5 is a cross section illustrating a device in accordance with a second exemplary embodiment of the present invention.

A device to which the motor of the present invention is mounted is demonstrated hereinafter. FIG. 5 is a cross section illustrating the device in accordance with the second exemplary embodiment of the present invention.

In FIG. 5, device 50 is a cellular phone. Motor 40 has been discussed in the first embodiment, and is now mounted directly to device board 51. In other words, a lower face of motor terminal is soldered to a land on an upper face of board 51 by re-flow soldering. Together with other circuit-components of the device, motor-driving-IC 52—the motor driver—is re-flow soldered to board 51. Battery 54 is mounted in housing 53 of device 50 to power IC 52 and circuits of device 50. Battery 54 also powers motor 40 via the land of board 51 and motor-terminals, thereby energizing the rotor. Attraction/repulsion between the stator and magnets rotates the rotor. Since the rotor has an eccentric weight, vibration due to rotor's revolving travels to the device and notifies a user of information such as a call or an alarm through body sensing. Device board 51 is placed in parallel with a bottom face of housing 53, and a motor's shaft is placed vertically with respect to board 51. The vibration is thus generated in parallel with the bottom face of device 50.

As such, the device in accordance with the second embodiment can accommodate such a small motor, e.g. the motor used in the first embodiment, that can be directly re-flow soldered to the device board. Therefore, the device can be downsized and slimmed. The re-flow soldering improves reliability and productivity of the device. Further, since the motor shaft is placed vertically with respect to the bottom face of device, the vibration is generated in parallel with the bottom face. The buoyancy by the vibration is thus weak when the device is laid on a table. Therefore, the device won't drop due to the buoyancy.

The present invention proves that the motor terminals can be mounted to the motor-base without using the insert-molding method, and yet, the structure allows high productivity. This advantage conspicuously appears in such a micro-motor, among others, that can be directly re-flow soldered to the device board. The device of the present invention can be mounted with the motor directly to the board by re-flow soldering, the productivity and reliability can be improved.

The present invention is not limited to the embodiments discussed above, and various modifications are available within the scope of the present invention. The present invention addresses a micro-motor as discussed in the embodiments; however, it is applicable to various motors.

INDUSTRIAL APPLICABILITY

A motor of the present invention is best-suited to a micro-motor as a vibrator mounted to, e.g. a cellular phone, and the micro-motor notifies a user of a call or an alarm by vibration. Motor terminals can be mounted to a motorbase without using an insert-molding method, and yet, high productivity is expected to this motor. The advantage of the present invention appears conspicuously in such a micro-motor, among others, that can be directly re-flow soldered to a board of a device. The device to be mounted with the motor can be re-flow soldered with the motor directly to a device board. High productivity and reliability are thus expected to the device.

What is claimed is:

1. A motor comprising:
   (a) a rotor;
   (b) a stator facing to said rotor;
   (c) a motor-base-assembly for journaling said rotor as well as holding said stator, said assembly including:
      (c-1) a motor-base made of resin and having an opening;
      (c-2) a terminal made of metal and mated with said motor-base by being inserted from the opening, and exposing a lower face thereof from a bottom face of said motor-base, wherein a winding terminal of said stator is coupled to an upper face of said terminal, and the lower face of said terminal is coupled to a board of a device to which said motor is mounted.

2. The motor as defined in claim 1, wherein said motor-base includes:
   a base having the opening;
   a bearing supporter for supporting a bearing which journals a shaft of said rotor; and
   a stator supporter for supporting said stator.

3. The motor as defined in claim 1, wherein said motor-base includes a terminal-engaging-section, and said terminal includes a base-engaging-section,
   wherein the terminal-engaging-section is engaged with the base-engaging-section.

4. The motor as defined in claim 2, wherein said motor-base includes a terminal-engaging-section, and said terminal includes a base-engaging-section,
   wherein the terminal-engaging-section is engaged with the base-engaging-section.

5. The motor as defined in claim 1, wherein said motor-base has a cut-off section through which proximity to a lower face of said terminal can be observed from a side of said motor-base.

6. The motor as defined in claim 2, wherein said motor-base has a cut-off section through which proximity to a lower face of said terminal can be observed from a side of said motor-base.

7. The motor as defined in claim 1, wherein said terminal is shaped in a plate with a step.

8. The motor as defined in claim 2, wherein said terminal is shaped in a plate with a step.

9. The motor as defined in claim 1, wherein said terminal is shaped in a circular plate.

10. A motor comprising:
    (a) a rotor;
    (b) a stator facing to said rotor;
    (c) a motor-base-assembly for journaling said rotor as well as holding said stator, said assembly including:
       (c-1) a motor-base made of resin and having an opening,
          wherein said motor-base includes a terminal-engaging section, and said terminal includes a base-engaging-section,
          wherein the terminal-engaging-section is engaged with the base-engaging-section;
       (c-2) a terminal made of metal and mated with said motor-base by being inserted from the opening, and exposing a lower face thereof from a bottom face of said motor-base; and
       (c-3) a coming-off preventing member formed close to the terminal-engaging-section for preventing said terminal from moving.

11. A device comprising:
    (a) a motor including;
       (a-1) a rotor;
       (a-2) a stator facing to said rotor;
       (a-3) a motor-base-assembly for journaling said rotor and holding said stator; said motor-base-assembly having:

a motor-base made of resin and having an opening;

a terminal made of metal and mated with said motor-base by being inserted from the opening, and exposing a lower face thereof from a bottom face of said motor-base.

(b) a board on which said motor is mounted;

(c) a driver for driving said motor.

12. The device as defined in claim 11, wherein the lower face of said terminal of said motor is coupled to said board by re-flow soldering.

13. The motor as defined in claim 2, wherein said terminal is shaped in a circular plate.

* * * * *